United States Patent [19]

Nickols

[11] Patent Number: 4,586,021

[45] Date of Patent: Apr. 29, 1986

[54] BICYCLE BRAKING INDICATOR LIGHT ASSEMBLY

[76] Inventor: Paul G. Nickols, Box 1182, Kansas City, Mo. 64141

[21] Appl. No.: 547,069

[22] Filed: Oct. 31, 1983

[51] Int. Cl.[4] ............................................. B62J 5/00
[52] U.S. Cl. ...................................... 340/134; 340/69
[58] Field of Search ................ 340/134, 69; 200/61.87

[56] References Cited

U.S. PATENT DOCUMENTS

| | | | |
|---|---|---|---|
| 3,188,418 | 6/1965 | Pino | 340/134 |
| 3,878,387 | 4/1975 | Kovacic | 340/134 X |
| 3,906,443 | 9/1975 | Musselman | 340/134 X |
| 4,031,343 | 6/1977 | Sopko | 340/134 X |

Primary Examiner—James L. Rowland
Assistant Examiner—Jeffery A. Hofsass
Attorney, Agent, or Firm—Kokjer, Kircher, Bradley, Wharton

[57] ABSTRACT

A battery powered lamp mounted on the rear of the bicycle is turned on and off in response to operation of switch associated with and located between an arm of the caliper brake mechanism for the rear wheel and the rear wheel yoke.

3 Claims, 5 Drawing Figures

BICYCLE BRAKING INDICATOR LIGHT ASSEMBLY

BACKGROUND AND SUMMARY OF THE INVENTION

This invention relates to bicycle accessories and more particularly provides an electrical brake indicator light for the bicycle which is turned on and off in response to operation of the hand brake of the bicycle.

Traditionally, rear mounted safety devices for bicycles have consisted either of non-illuminated reflectors or illuminated rear safety lights powered either by battery or by a wheel driven generator and constantly on while running. With only these devices available, there has been no way for a following bicycle or other vehicle to be warned of a slowing down of the bicycle or impending rapid stop.

The principal object of the present invention is to provide a simple, inexpensive and effective brake indicator light system which is combined with already existing braking and structural parts of the bicycle and is operable to provide a visual signal to those behind the bicycle that the brake is being applied.

A further and important object of the invention is to provide such a system in which the added components are simple in construction, light in weight and easily incorporated on the bicycle to produce an operative system. It is a feature of the invention in this respect that the components are so constructed as to be capable of association with bicycles of substantially differing structural configuration without requiring special adapters or add-on equipment.

Another object of the invention is to provide a system of the character described in which the electrical switching component of the system is so located as to be protected by structural components of the bicycle from accidental blows which might disconnect it or result in damage.

The foregoing objects are achieved in general by a system which briefly described, comprises a lamp mounted on the bicycle to be visible from the rear of the bicycle and an electrical system incorporated with the lamp which includes a switching circuit which includes a switch which is operatively associated with the caliper braking mechanism for the rear wheel of the bicycle in a manner that the lamp is turned on and off by the switch in response to operation of the brake mechanism. The switch is mounted on a caliper arm adjacent the brake pad on that arm and is so located relative to the rear wheel yoke and caliper arm that the yoke and arm cooperate to operate the switch in response to the movement of the arm.

Other objects and advantages of the invention together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals indicate like parts in the various views.

Figure 1:
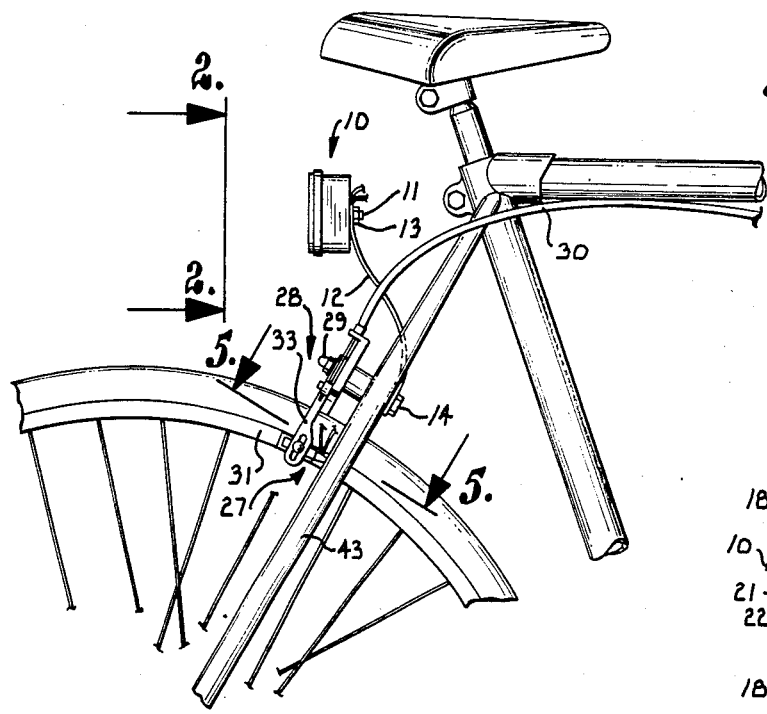
FIG. 1 is a fragmentary side elevational view of the rear wheel, rear yoke and frame of a bicycle equipped with the preferred embodiment of the braking indicator light assembly according to our invention.
Figure 2:
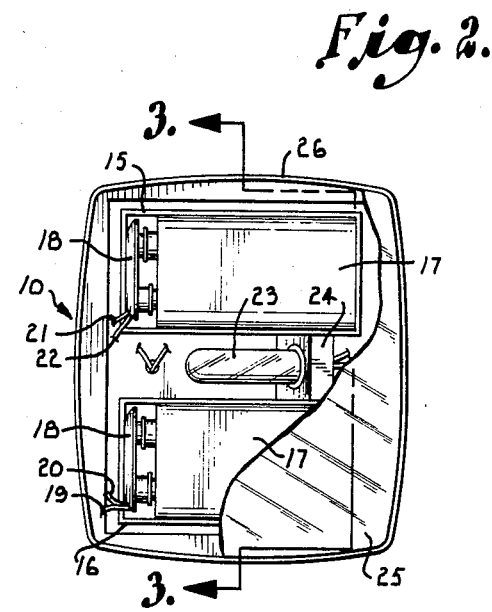
FIG. 2 is an enlarged elevational view of the light housing, being taken generally from line 2—2 of FIG. 1 in the direction of the arrows, part of the reflector-lens being broken away for purposes of illustration.
Figure 3:
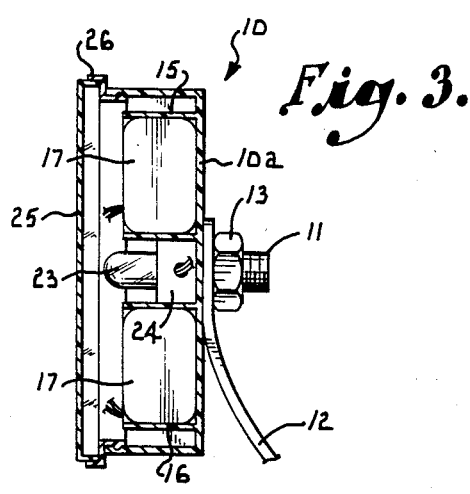
FIG. 3 is a cross sectional view taken along line 3—3 of FIG. 2 in the direction of the arrows.
Figure 4:
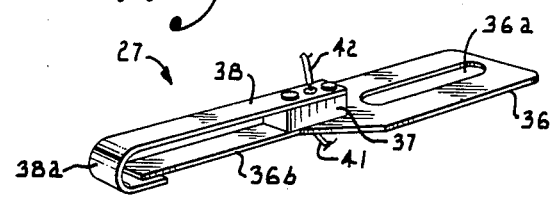
FIG. 4 is an enlarged perspective view of the switch mechanism, shown detached from the brake caliper arm.

The braking light indicator assembly includes a box-like housing 10 which can be made by molding plastic. One wall 10a of the housing is closed and has affixed thereto a projecting threaded shaft 11. The shaft 11 extends through an aperture near one end of and in a mounting bracket 12. A nut 13 on shaft 11 serves to affix the housing to the bracket 12. The other end of bracket 12 is similiarly secured, as at 14, to the bicycle brake assembly or any convenient portion of the bicycle frame.

The interior of the housing 10 includes two battery compartments 15 and 16 each intended to hold a conventional nine volt battery 17 having snap terminals. The battery terminals are in each case connected with corresponding snap couplers having conductor wires 19, 20, 21, 22 which form a part of an electrical circuit which includes the lamp bulb 23 received in an appropriate socket 24.

The open end of housing 10 is covered by a translucent combined reflector and lens 25 preferably colored red. A particularly suitable reflector-lens is disclosed in U.S. Pat. No. Des. 246,163, issued Oct. 25, 1977. The reflector-lens has its rim secured to an adapter ring 26 which is press fitted into the open end of the housing.

The switch for controlling the lamp is identified by reference numeral 27. The switch is mounted on one arm of the caliper brake system 28 for the bicycle as detailed in FIG. 5.

The brake system is conventional, including a pair of arms pivoted to one another as at 29 and operated by control cable 30 which extends forwardly to the hand levers on the handle bar (neither of which are shown) for the bicycle. The arms carry at their lower ends brake pads which can be clamped against the wheel rim 31 to apply braking power in response to operation of the hand levers. Switch 27 is mounted on a brake pad holder 32 which is secured to one of the brake arms 33 by the bolt 34 and cap nut 35.

The switch includes a mounting plate 36 preferably formed from a sheet of stiff but bendable material having good properties of electrical conductivity. An elongate mounting slot 36a is formed in the plate. The slot permits lengthwise adjustment of the position of the plate to accommodate mounting adjustments for various makes of bicycles and brake systems and likewise the plate can be bent as necessary and pivoted around the axis of bolt 34 to accommodate the mounting adjustments for various makes of bicycles and brake systems.

A tongue section 36b extends from one end of the mounting plate 36 and forms one of the electrical contact arms for the switch. An insulated spacer 37 of dielectric material is connected to plate 36 and provides a base on which is secured the other contact arm 38 of the switch. Arm 38 is formed with a U-bend 38a and a contact pad 39 is located on the inside outer end portion of the bend. A similar opposed contact pad 40 is on tongue 36b.

The arm 38 is made of a relatively stiff but resilient material having good electrical conductivity, for example, bronze. The same material can be used for plate 36. The switch is so designed that in the absence of lateral pressure on the outside of arm 38, the switch contact pads are in contact, i.e., the switch is normally closed. Conductor wires 41 and 42 are electrically connected with plate 36 and arm 38, respectively.

Figure 5:
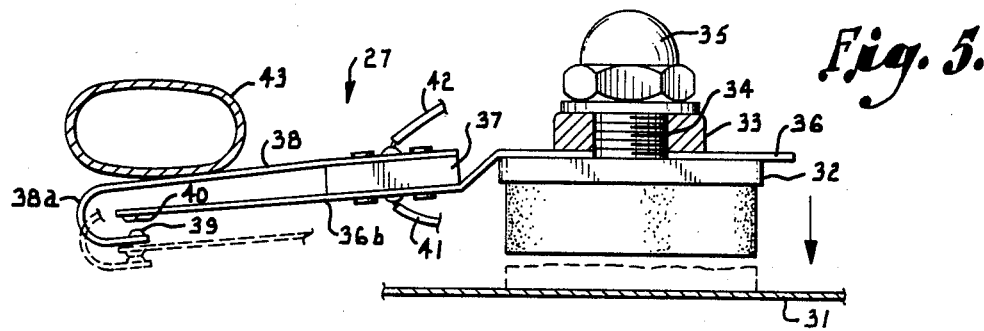
FIG. 5 is an enlarged fragmentary cross section taken along line 5—5 of FIG. 1 in the direction of the arrows.

Again as best seen in FIG. 5, the switch is installed in a manner to locate the outside of arm 38 to the inside of and adjacent one leg 43 of the rear wheel yoke of the bicycle. The switch position is adjusted so that when the brake calipers are in the open, wheel freeing position, switch arm 38 is engaged by the confronting inside surface of the yoke leg 43 adjacent the switch and is deflected to break contact between the contact pads of the switch. It will be understood that the switch is connected in series between the batteries and lamp with the batteries in series with each other.

In operation, when the rear brake is activated the calipers move toward one another, thereby displacing the brake pads toward the wheel rim as shown in FIG. 5. The switch 27 is also displaced, which relieves the pressure on arm 38, permitting it to straighten and thereby closing the electrical contacts. This in turn closes the electrical circuit to the lamp which illuminates the lens-reflector to signal that the brake is being applied. As will be evident release of the brake pressure breaks the circuit to the lamp thus returning it to the "off" condition.

Locating the switch in the protected position between the leg of the yoke and wheel results in insuring against damage to the switch.

The system is inexpensive, requires few parts and can be installed and removed or repaired if need be with a minimum of tools and effort.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. For a bicycle having a braking light indicator system which is responsive to braking of the bicycle, said bicycle including a hand operated caliper brake mechanism having a pad carrying caliper arm removable between non braking and braking positions, said indicator system including
(a) an electric lamp mounted on the bicycle,
(b) means for providing a source of electrical energy for said lamp,
(c) switch means operable to connect and disconnect said source with said lamp, said switch means including electrical switch contact members, one of said members moveable relative to the other between a switch closed and switch open condition, said one member resiliently biased toward the closed position, said switch means mounted on said caliper arm and so positioned on said caliper arm relative to the bicycle that when the caliper arm is in a non-braking position the moveable contact of the switch is engaged by a surface on said bicycle fixed in position relative to said caliper arm and operable to deflect and hold the moveable contact in the switch open condition, and when the caliper arm is in a braking position the moveable contact is disengaged from said fixed surface and is in the switch closed condition, thereby to connect said source with said lamp.

2. A system as in claim 1,
said mounting means including means permitting variation in positioning of said switch relative to said caliper arm.

3. A system as in claim 1 in which said bicycle includes a wheel yoke and said caliper arm is located adjacent said yoke,
said surface being a surface portion of said wheel yoke.

* * * * *